Aug. 5, 1958 — L. T. WORK — 2,846,150
FLUID ENERGY GRINDING
Filed Sept. 29, 1955 — 2 Sheets-Sheet 1
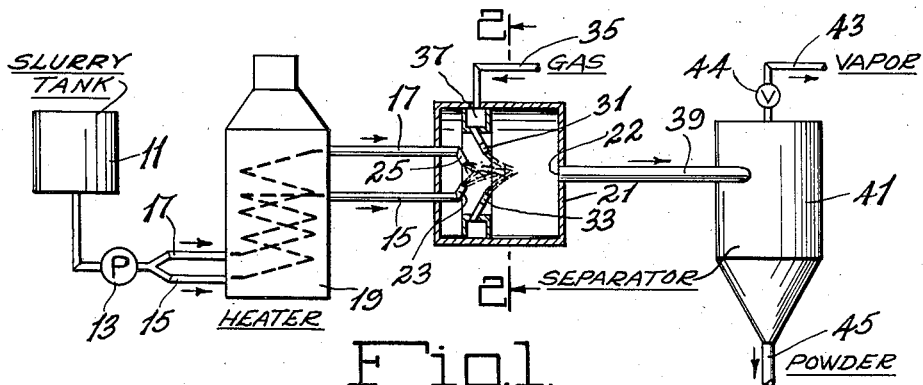
Fig.1.
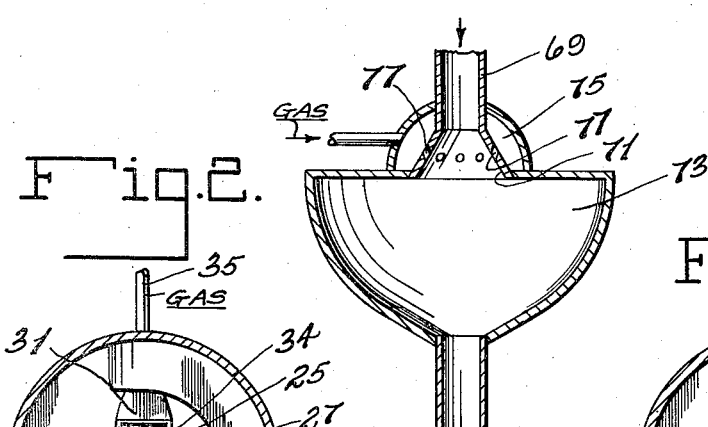
Fig.2.
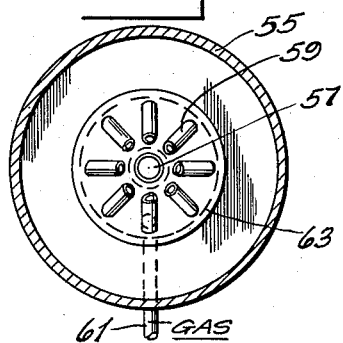
Fig.4.
Fig.5.
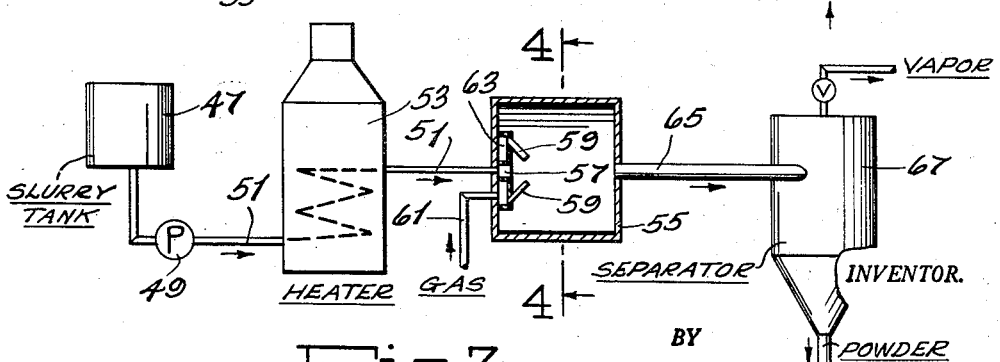
Fig.3.
INVENTOR.
BY

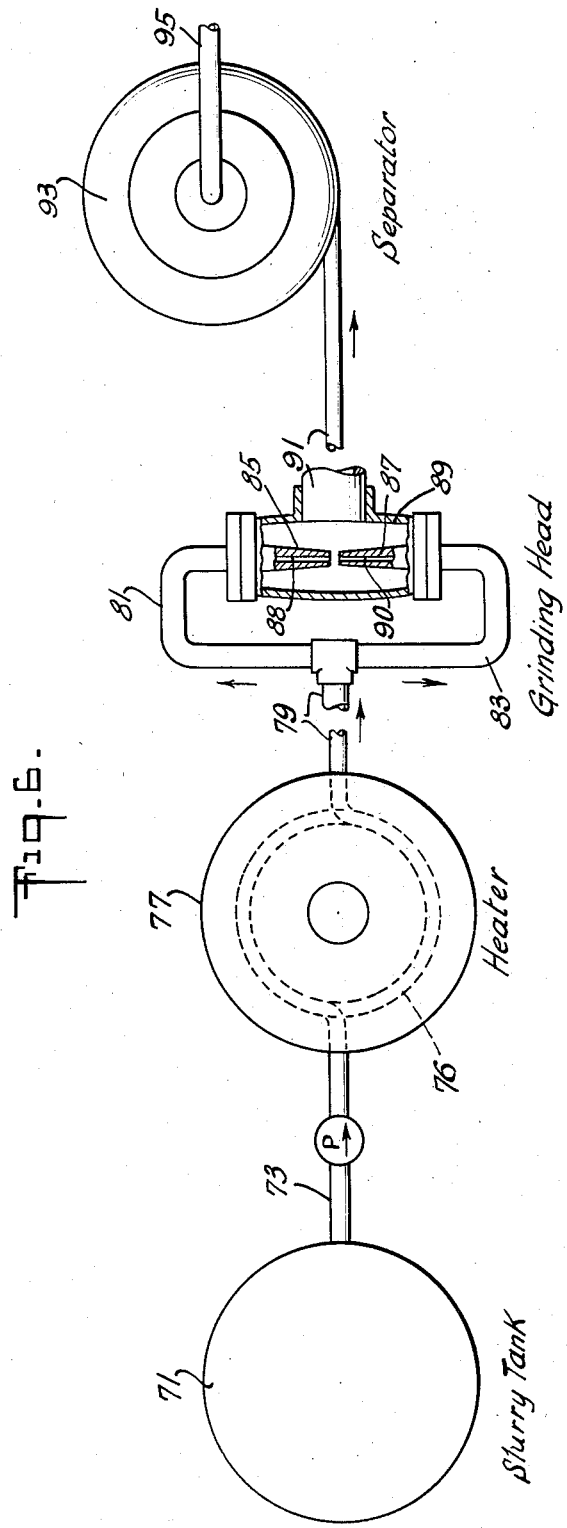

United States Patent Office 2,846,150
Patented Aug. 5, 1958

2,846,150

FLUID ENERGY GRINDING

Lincoln T. Work, Maplewood, N. J., assignor to Texaco Development Corporation, New York, N. Y., a corporation of Delaware Application September 29, 1955, Serial No. 537,386

18 Claims. (Cl. 241—5)

The present invention relates to a novel method of and apparatus for disintegrating solid materials by employing fluid energy.

It has been proposed in the past to grind solid particles of material such as coal, talc, barite, aluminum, magnesium, clay and oyster shells by suspending them in a gas and passing the resulting dispersion at high velocity in turbulent flow through a long tube of small diameter, such as a steel grinding tube 300 feet long and ½ inch in diameter. Velocities over 100 feet per second, and often as high as several thousand have been employed.

While successful grinding has been obtained, serious erosion of the grinding tube may occur, reducing the life of the apparatus and often affecting the product adversely in color or chemical properties. Furthermore, when the suspending gas is a heated vapor such as steam, or oil and kerosene vapors, such high temperatures are required to develop the necessary velocity and turbulence that the apparatus and the product may be harmed.

In accordance with the present invention there is provided a novel method and apparatus for grinding by fluid energy while substantially eliminating erosion difficulties. Also, relatively low operating temperatures may be employed. A dispersion in a gas of solid particles such as mentioned above flows at relatively low velocity through a tube and is then injected into a disintegrator chamber of relatively large volume where the final disintegration of particles is accomplished by subjecting them to extreme turbulence whereby they impinge against each other at high velocity.

One way that turbulence is developed is by injecting the dispersion into the disintegrating chamber as a plurality of oppositely directed intersecting streams which impinge against one another at a large angle, so that the particles are fragmented by impact with one another. Additionally, one or more auxiliary jets of high velocity gas can be discharged against the injected dispersion to increase turbulence therein, whereby the particles impinge against one another and are reduced in size. Turbulence also can be developed by injecting the dispersion as one or more non-intersecting streams against which one or more auxiliary jets of high velocity gas impinge.

In the drawings:

Figure 1 is a schematic side elevational view, partly in section, of apparatus for performing my novel method;

Figure 2 is a cross-sectional view taken along the line 2—2 in Figure 1;

Figure 3 is a side elevational view, partly in section, showing apparatus for performing a modification of my method;

Figure 4 is a cross-sectional view taken along the line 4—4 in Figure 3;

Figure 5 is a vertical sectional view through a part of a modified form of apparatus for performing the invention; and Figure 6 is a plan view of still another embodiment of apparatus for performing the invention, showing 180° opposed nozzles.

As shown in Figure 1, the solid particles to be ground are mixed intimately with a vaporizable liquid to form a slurry in a tank 11, which may include an agitator such as a motor-driven paddle. This slurry is equally distributed by a pump 13 into a pair of conduits 15 and 17 within a heater 19, such as an oil or gas-fired furnace. For vaporizing liquefied gases, heater 19 may comprise spray nozzles or other means for bringing a heat exchange liquid such as water into heat exchange relationship with the conduits. The conduits 15 and 17 can be arranged in any desired way within the heater 19 to secure the greatest space economy while assuring that the material in both conduits is heated to about the same temperature. As shown, the two conduits are arranged as nested coils, but other arrangements also can be used, such as parallel straight pipes connected together by return bends.

Many vaporizable liquids can be used such as water, kerosene, mineral oil, or such liquefied gases as propane, butane, and air. Selection of the slurry liquid depends mainly on the nature of the material being ground. Water can be used for relatively stable materials such as coal, talc, barite, and oyster shells. Kerosene or oil should be used with metals, which may react with steam. Cold liquefied gases are useful for materials that are soft at high temperatures, such as waxes and resins.

Within the heater 19 the slurry in conduits 15 and 17 is heated above the vaporization temperature of the slurry liquid so that part-way through the conduits there is formed a flowing dispersion of the solid particles in gas. This dispersion flows the rest of the way through the conduits 15 and 17 at a low velocity, say 10–100 feet per second, which is sufficient to carry the particles with minimum erosive effect. Some preliminary grinding of the particles occurs as they impinge against one another while flowing through the heater tubes.

The discharge ends of conduits 15 and 17 are arranged within a disintegrator chamber 21 of relatively large volume so that the dispersion is suddenly reduced greatly in pressure. Discharge nozzles 23 and 25 on the ends of the conduits, are inclined toward the outlet 22 of chamber 21, and are so opposed to one another that the streams of dispersion are discharged with about equal mass and velocity against one another. An included angle of about 120 degrees is satisfactory, but smaller or larger angles up to 180 degrees can also be used, the advantages of the latter being described in detail hereinafter. The nozzles 23 and 25 should be placed close enough together to preserve the high momentum of the discharged particles. For example, the distances from the nozzles to the point where their axes intersect should be about one inch or less for optimum results. Stream velocities in the range of 10–100 feet per second are useful, but higher velocities up to and greater than sonic, e. g., 2000 or 3000 feet per second, are more effective and can be obtained by employing discharge nozzles of smaller cross-sectional area than the conduits 15 and 17, advantageously having convergent-divergent passages.

As shown clearly in Figure 2, it is advantageous for the nozzles 23 and 25 to have relatively wide and thin parallel orifices 27 and 29 so that the dispersion is injected into the chamber 21 as a pair of wide and thin intersecting sheet-like streams. Grinding of the particles to an extremely fine condition thus occurs in the chamber 21 without the erosion formerly encountered.

While successful grinding can be obtained solely by impacting the jets against one another from the nozzles 23 and 25, this grinding effect is greatly augmented by discharging one or more auxiliary high velocity jets of gas against the dispersion from suitable nozzle means. For this purpose two opposed nozzles 31 and 33 are located downstream of nozzles 23 and 25 on opposite sides of the injected dispersion, and are inclined in the direction of dispersion flow. Extreme turbulence thus is developed in the dispersion, whereby the particles impinge against one another and are further reduced in size.

Nozzles 31 and 33, which have wide thin orifices 32 and 34 parallel to orifices 27 and 29, can be supplied with high velocity auxiliary gas in any desired way, as by a conduit 35 connected to a header 37 on the inside of chamber 21. The header 37 can have more or less than two nozzles 31 and 33, and nozzles also can be arranged annularly around the flowing dispersion in a circular header. Header 37 can be supplied with any gas that is the same as or compatible with the material being ground and its conveying gas. Steam and air are among the most common gases useful for this purpose. The velocity of the jets should be high enough to create extreme turbulence, advantageously being above 100 feet per second and even as high as several thousand feet per second.

From disintegrator chamber 21 the dispersion of fine particles in gas then passes by a conduit 39 into a separator 41 wherein the gas is separated from the powder, the former leaving at the top by a valve-controlled conduit 43, and the latter leaving at the bottom through a conduit 45. Valve 44 regulates the back pressure on the system. A conventional separator can be employed, such as one of the cyclone type.

In the modification shown in Figures 3 and 4, the slurry is formed in a tank 47 and transferred by a pump 49 into a single conduit 51 which is heated in a heater 53 to vaporize the slurry liquid and form a relatively slow-moving dispersion. The discharge end of conduit 51 connects with a disintegrator chamber 55 into which the dispersion is discharged in a single stream through a central orifice 57. Orifice 57 can be round as shown, or may be oval or rectangular.

For producing extreme turbulence in the dispersion there is provided an annularly arranged series of injector nozzles 59 which inject jets of gas at high velocity through their outlets against the flowing dispersion from all sides, thus producing turbulence and resultant grinding. Nozzles 59 are inclined toward the injected stream of dispersion at an angle of about 45 degrees, but larger or smaller angles may be employed. Velocities up to and greater than sonic, e. g., 2000 or 3000 feet per second can be used, such as may be provided by nozzle passages of the convergent-divergent type. Gas is supplied to the nozzles 59 by a conduit 61 opening into a header 63 inside of chamber 55.

The dispersion of disintegrated particles in gas then flows from chamber 55 through a conduit 65 into a separator 67 wherein the speration of gas and powder occurs.

In the modification shown in Figure 5 the dispersion of solid particle flows through a conduit 69 having a flared end portion 71 opening centrally into the top of a disintegrator chamber 73. High velocity steam or other gas is supplied to an annular header 75 and passes at high velocity into the dispersion, just before it enters chamber 73, through an annularly arranged series of forwardly inclined discharge ducts 77 having orifices arranged on the flared end portion 71. The resulting increased velocity and tubulence of the dispersion develop a pronounced grinding effect.

Fig. 6 shows a preferred modification of the invention wherein 180° opposed nozzles are used for discharging diametrically opposed high velocity streams of dispersion of substantially equal mass and velocity against one another.

A mixture of solids in liquid is forced from tank 71 through a conduit 73 into a helical pipe coil 76 in a heater 77. All or a substantial part of the liquid is vaporized to form a dispersion of solid particles in vapor which flows at a moderate relatively non erosive velocity such as around 100 feet per second or less through coil 77 and out through conduit 79.

The dispersion in conduit 79 is then split into two streams which pass through a pair of ducts 81 and 83 to a pair of discharge nozzles 85 and 87 projecting from opposite sides of a relatively large diameter chamber 89 to the interior thereof.

The two nozzles have passages 88 and 90 therethrough of circular cross section which are axially aligned with one another and have their outlets diametrically opposed to one another at an angle of 180°.

Nozzle passages 88 and 90 for at least part of their length are of much smaller cross sectional area than the ducts 81 and 83 so that the velocity of the dispersion passing therethrough is tremendously increased to hundreds and even thousands of feet per second. For example the ducts 81 and 83 may be of ½ to 1 inch pipe, the conduit 79 and the pipe coil 76 may be of ½ to 2 inch iron pipe, and the passages 88 and 90 may have outlets only about 5/32 inch in diameter.

The volume of chamber 89 is large enough to reduce the dispersion pressure and velocity to a value low enough to prevent undue erosion downstream of the nozzles. For example, chamber 89 may be located in a pipe T having legs of about 4 to 6 inches inside diameter. Downstream erosion is additionally reduced to a minimum by impinging the two high velocity jets directly against each other, thus dissipating the velocity to a greater extent than would be possible with impingement angles of less than 180°.

From chamber 89 the low velocity dispersion of now finely disintegrated solid particles in vapor passes through conduit 91 into cyclone separator 93, solids passing off the bottom and vapor passing off the top through conduit 95.

The construction and operation described above with reference to Fig. 6 have several important and special advantages, as follows:

(*a*) Erosion downstream of the nozzles is greatly reduced because the high individual jet velocities are dissipated and cancel out each other when the jets collide at 180°.

(*b*) Advantage (*a*) is obtained while at the same time avoiding erosive wear of the nozzle tips, which would normally be expected as the result of high mass particles from one jet penetrating the other and impinging against the diametrically opposite nozzle. This is believed due to the substantial size reduction to 10 microns or less which occurs as the streams of dispersion flow at high velocity through the nozzles, before entering chamber 89, so that very few particles exist which are capable of penetrating the jets.

(*c*) A given physical volume of equipment with 180° impingement nozzles will have much greater capacity than the same volume of equipment using less than 180° impingement.

(*d*) The dissipation of velocity in chamber 89 makes it possible to use a relatively short pipe 91 leading to the cyclone separator. Otherwise, velocity must be dissipated in a relatively long pipe 91.

EXAMPLE

A slurry containing 50% by weight of coarse ground talc in water was passed into 1320 feet of heated ½ inch iron pipe at a pressure of 1450 p. s. i. g. and a rate of 1348 pounds per hour. The slurry was heated to a maximum temperature of 717° F. at the heater pipe outlet where the discharge pressure was 725 p. s. i. g. The resulting dispersion then flowed to a pair of 180° opposed nozzles having 5/32 inch discharge orifices spaced ⅝ inch apart, and was discharged into a pipe T having 4 inch legs, one of which was connected to a cyclone separator by a 4 inch pipe.

The following table compares the particle size of the talc product with the talc feed:

Table

| Particle Size U. S. Sieve No. | Feed Cumulative Percent, Coarser Than— | Product Cumulative Percent, Coarser Than— |
|---|---|---|
| 18 | 8.3 | |
| 60 | 54.1 | |
| 100 | 69.6 | |
| 200 | 87 | |
| 325 | 95.7 | 5.67 |

| Microns | Percent Less Than— |
|---|---|
| 32 | 90 |
| 12 | 70 |
| 4.2 | 50 |
| 1.7 | 30 |

It is apparent that several pairs of opposed nozzles may be operated at the same time from a single heating coil, if desired.

Operating conditions depend upon the nature of the slurry liquid, which must be heated only enough above its boiling point to assure a velocity sufficient to carry the particles without eroding the conduits excessively. The higher the back pressure on the conduits 15, 17, 51, 69, and 77 the higher is the temperature needed. For example, for back pressures ranging from atmospheric to 1000 pounds per square inch gauge, water may be heated to temperatures between 212 and 550° F.; kerosene between 500 and 800° F.; and liquefied gases such as propane, butane, or air require temperatures at or only slightly above that of the ambient atmosphere, exposure of the heating conduits to the atmosphere or to warm water being all that is necessary to effect vaporization.

The temperature of the steam, air, oil vapor, propane, butane, or other gas injected through nozzles 31, 33, 59 and 77 preferably should be about the same as, or higher than, that of the dispersion entering the disintegrator chambers to prevent condensation.

It is apparent that I have provided a novel method of and apparatus for employing fluid energy to disintegrate particles of solid material while substantially eliminating the detrimental erosion which was encountered in the prior art. Also, it is evident that my novel method can be operated at lower temperatures than previous procedures so that detrimental heat effects on the apparatus, and on the product can be avoided.

Among other advantages, especially over prior art aspirator type opposed nozzle devices, are the higher velocity, higher ratio of solids to vapor, and higher operating pressures that are possible with the present invention.

Aspirator type devices require either a hopper under high pressure to force powder into a nozzle, or else require such a high pressure drop through the aspirator that velocity is reduced unduly. Also, there is a better more uniform distribution of solid particles over the stream cross section, and powder slugging is avoided.

Still other advantages are that any detrimental erosion is localized in a small and easily replaceable device instead of in long pipe coils, that heat loss to the atmosphere is small in such a small device, and that the small size of the grinding device coupled with its tremendous capacity makes it possible to use the best and most expensive quality of parts while keeping the cost per pound of capacity extremely low.

Obviously, many modifications and variations of the above invention as hereinbefore set forth may be made without departing from the spirit and scope thereof, and therefore, only such limitations should be imposed as are indicated in the appended claims.

This application is a continuation-in-part of my copending application Serial No. 360,188, filed June 8, 1953, now abandoned.

I claim:

1. A method for reducing the size of coarse particles of a solid material comprising forming a flowable mixture of said coarse particles in a vaporizable liquid; forcing said mixture through a heating zone while heating said mixture sufficiently to vaporize a substantial amount of said liquid and form a flowing dispersion of particles in vapor flowing under pressure at a relatively low velocity; forming said dispersion into a pair of streams flowing at a relatively much higher velocity; and impinging said streams against each other at an angle of 180° while suddenly reducing the pressure thereof, thereby dissipating the velocity of said streams and creating great turbulence.

2. Apparatus for reducing the size of coarse particles of a solid material comprising first means for forming a flowable mixture of said coarse particles in a vaporizable liquid; heater pipe means of relatively large diameter connected to said first means; second means for forcing said mixture into said heater pipe means; third means for heating the mixture in said heater pipe means to vaporize liquid from said mixture and form a flowing dispersion of particles in vapor; a chamber; a pair of nozzles having passages extending therethrough of smaller cross section than said heater pipe means for increasing the velocity of said dispersion above that in said heater pipe means, said passages being aligned axially with each other and having opposed orifices spaced closely together in said chamber whereby high velocity jets of dispersion impinge together at 180°; and means for connecting said pair of nozzles both to said heater pipe means for delivering streams of dispersion directly thereto.

3. A method for reducing the size of coarse particles of a solid material comprising forming a flowable mixture of said coarse particles in a vaporizable liquid; passing said flowable mixture through a heating zone while heating said mixture sufficiently to vaporize a substantial amount of said liquid and form a flowing dispersion comprising a mixture of particles with vapor flowing under pressure at a relatively low velocity; forming one of said mixtures into a plurality of streams whereby there result a plurality of streams of a dispersion of particles in vapor; increasing the velocity of said streams of dispersion to a relatively much higher velocity; and impinging said streams of dispersion against each other at a large angle while suddenly reducing the pressure thereof, thereby dissipating the velocity of said streams and creating great turbulence.

4. A method in accordance with claim 3 wherein a pair of said streams of dispersion are impinged against each other at an angle of 180°.

5. A method in accordance with claim 3 wherein said impinging streams of dispersion are relatively wide and thin sheet-like jets.

6. A method in accordance with claim 3 also comprising the step of discharging at least one jet of high velocity gas against said impinging streams to assist in developing great turbulence therein.

7. A method in accordance with claim 3 wherein said flowable mixture of coarse particles in vaporizable liquid is formed into said plurality of streams prior to vaporization of said liquid.

8. A method in accordance with claim 7 wherein a pair of said streams of dispersion are impinged against each other at an angle of 180°.

9. A method in accordance with claim 3 wherein said dispersion is formed into said plurality of streams after vaporization of said liquid and before impingement of said streams against one another.

10. A method for reducing the size of coarse particles of a solid material comprising forming a flowable mixture of said coarse particles in a vaporizable liquid; forcing said mixture into a heating zone while heating said mixture sufficiently to vaporize a substantial amount of said liquid and form a flowing dispersion of particles in vapor; delivering said flowing dispersion as a single stream flowing at high velocity into a zone of reduced pressure; and impinging against said single stream of dispersion in said zone a plurality of jets of gas from positions surrounding said single stream to generate great turbulence therein.

11. Apparatus for reducing the size of coarse particles of a solid material comprising first means for forming a flowable mixture of said coarse particles in a vaporizable liquid; heater pipe means of relatively large diameter connected to said first means; second means for forcing said mixture into said heater pipe means; third means for heating the mixture in said heater pipe means to vaporize liquid from said mixture and form a flowing dispersion of particles in vapor; a chamber; injector means having a plurality of passages of smaller cross section than said heater pipe means for increasing the velocity of said dispersion above that in said heater pipe means, said passages having axes intersecting one another at a large angle and having orifices spaced closely together in said chamber, whereby high velocity jets of dispersion impinge together at a large angle; and means connecting all of said passages to said heater pipe means for delivering streams of dispersion directly thereto.

12. Apparatus in accordance with claim 11 wherein said passages are wide and thin for discharging said high velocity jets as relatively wide and thin sheet-like jets.

13. Apparatus in accordance with claim 11, also comprising passage means for discharging at least one jet of high velocity gas against said impinging streams of dispersion to assist in developing turbulence therein.

14. Apparatus for disintegrating a solid material comprising means for forming at least two streams of a flowing dispersion of particles of said solid material in a fluid, said means comprising a pair of elongated tubes, means for heating said tubes substantially equally, and means for forming a flowable mixture of solid particles in a vaporizable liquid connected to said tubes for supplying such flowable mixture to said tubes at substantially equal feed rates; a chamber; and injecting means for injecting said streams into said chamber so that said streams impinge against one another at a large angle and said particles are fragmented by impact with one another.

15. Apparatus in accordance with claim 14 wherein said injecting means comprises a pair of nozzles having passages extending therethrough of smaller cross section than said tubes for increasing the velocity of said dispersion above that in said tubes, said passages being aligned axially with each other and having opposed orifices spaced closely together in said chamber whereby high velocity jets of dispersion impinge together at 180°.

16. Apparatus in accordance with claim 11 wherein said heater pipe means comprises a single continuous length of pipe; said apparatus also comprising a pair of ducts connecting said single pipe to said injector means for delivering dispersion to all of said passages.

17. Apparatus in accordance with claim 16 wherein said injector means comprises passages of smaller cross section than said pipe for increasing the velocity of said dispersion above that in said pipe, said passages being aligned axially with each other and having opposed orifices spaced closely together in said chamber, whereby high velocity jets of dispersion impinge together at 180°.

18. Apparatus for reducing the size of coarse particles of a solid material comprising first means for forming a flowable mixture of said coarse particles in a vaporizable liquid; an elongated heater pipe connected to said first means for vaporizing liquid and forming a flowing dispersion of particles in vapor; means for heating said pipe; a chamber at a pressure lower than in said pipe; passage means for injecting flowing dispersion from said pipe into said chamber as a single stream flowing at high velocity; and a plurality of passages surrounding said passage means for injecting a plurality of jets of gas against said stream of dispersion to produce great turbulence therein.

References Cited in the file of this patent

UNITED STATES PATENTS

| | | |
|---|---|---|
| 864,209 | Stokoe | Aug. 27, 1907 |
| 2,032,827 | Andrews | Mar. 3, 1936 |
| 2,494,153 | Andrews | Jan. 10, 1950 |
| 2,560,807 | Lobo | July 17, 1951 |
| 2,602,595 | Thomas | July 8, 1952 |
| 2,763,434 | Strasser | Sept. 18, 1956 |
| 2,763,437 | Marchant | Sept. 18, 1956 |